Oct. 24, 1933.  G. F. BOESSER  1,932,098
COMBINED CAMERA AND FLASH LAMP
Filed Jan. 12, 1933
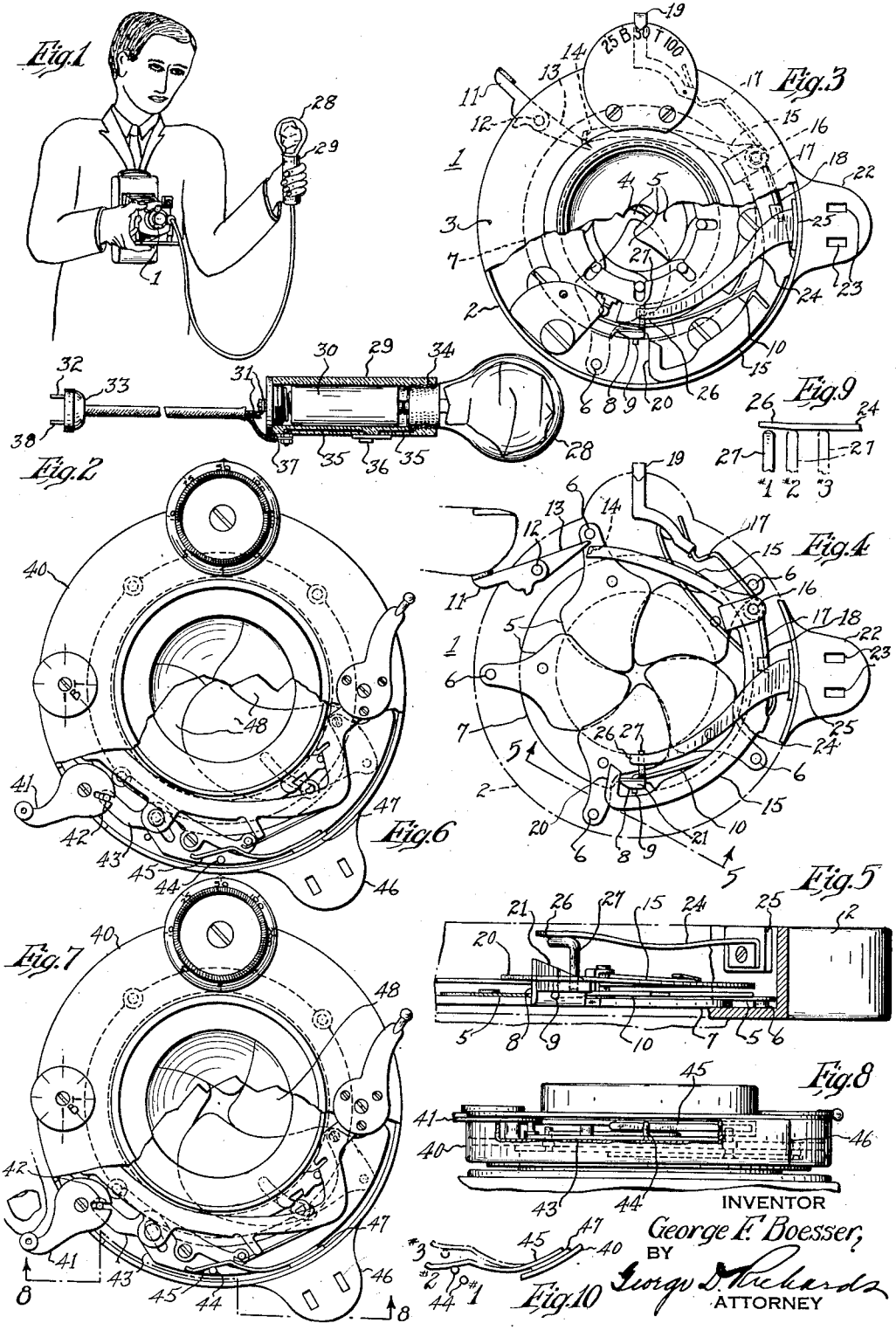
INVENTOR
George F. Boesser,
BY
George D. Richards
ATTORNEY Patented Oct. 24, 1933

1,932,098

UNITED STATES PATENT OFFICE 1,932,098

COMBINED CAMERA AND FLASH LAMP

George F. Boesser, Arlington, N. J.

Application January 12, 1933. Serial No. 651,271

6 Claims. (Cl. 67—29)

This invention relates, generally, to the taking of pictures by flashlight; and the invention has reference, more particularly, to a novel device for automatically synchronizing flash bulb and camera shutter operations, whereby any amateur may successfully take flashlight pictures.

Heretofore it has been practically impossible for amateurs to take flashlight pictures when using photo-flash bulbs because the operation of the camera shutter and the operation or ignition of the photo-flash bulb could not be properly synchronized. Ordinarily, a person, when taking such a picture, would press the shutter control lever with one hand and at the same time he would close the switch of the photo-flash bulb circuit with the other hand, but in such cases, the almost instantaneous exposure provided by the operation of the camera shutter, would be complete before the photo-flash bulb actually operated to illuminate the subject, with the result that the picture would be a failure. When such person attempted to close the photo-flash bulb circuit first and then operate the camera shutter thereafter, it was found exceedingly difficult or almost impossible to obtain synchronization of the opening of the shutter, with the lighting of the photo-flash bulb.

The principal object of the present invention is to provide a novel device for synchronizing the operation of the photo-flash bulb with the operation of the camera shutter so that any amateur can readily take perfect flashlight pictures.

Another object of the present invention lies in the provision of a device for synchronizing photo-flash bulb and camera shutter operations, which device comprises switch means operated by mechanism closely associated with the operation of the camera shutter, which switch means serves to effect the closure of the photo-flash bulb circuit in synchronization with the initiation of the shutter opening movement, whereby the photo-flash bulb is caused to illuminate the object in synchronism with the opening of the camera shutter.

Still another object of the present invention is to provide a novel device of the above character which is adapted to be applied to any type of camera shutter, the said device providing an attractive electrical socket into which a plug connected to a photo-flash bulb and battery may be readily inserted when it is desired to take photo-flash pictures.

Still another object of the present invention lies in the provision of a novel synchronizing device of the above character which is of simple construction and is reliable and durable in use.

Other objects of this invention, not at this time more particularly enumerated, will be clearly understood from the following detailed description of the same.

The invention is clearly illustrated in the accompanying drawing, in which:

Fig. 1 is a view illustrating the use of the synchronizing device of the present invention.

Fig. 2 is a view, with parts broken away, illustrating the photo-flash bulb, battery and wiring therefor.

Fig. 3 is a view in elevation, with parts broken away, of a camera shutter showing the novel synchronizing device of the present invention applied thereto, the shutter being illustrated in closed position.

Fig. 4 is a diagrammatic view of a portion of the structure shown in Fig. 3 and illustrates the operation of the synchronizing device just as the shutter is beginning to open.

Fig. 5 is an enlarged sectional view, taken substantially along line 5—5 of Fig. 4, looking in the direction of the arrows.

Fig. 6 is a plan view, with parts broken away, illustrating the novel synchronizing device of the present invention applied to a different type of camera shutter, the said shutter being shown in closed position.

Fig. 7 is a view similar to Fig. 6 but illustrates the operation of the synchronizing device just as the shutter commences to open.

Fig. 8 is a part sectional view taken substantially along line 8—8 of Fig. 7 looking in the direction of the arrows.

Fig. 9 is a schematic view illustrating the operation of the device of this invention as applied to the structure shown in Figs. 1 to 5; and Fig. 10 is a schematic view illustrating the operation of the device of this invention as applied to the structure shown in Figs. 6 to 8.

Similar characters of reference are employed in all of the above described views to indicate corresponding parts.

Referring now to Figs. 1 to 5 of the said drawing, the reference numeral 1 designates a camera shutter as a whole, which camera shutter is equipped with the novel synchronizing device of the present invention. Shutter 1 comprises a casing 2 having a face plate 3 that has a central light aperture 4, which light aperture permits light to enter the interior of the camera. To the rear of the light aperture 4 there is positioned a plurality of shutter blades 5, which shutter blades are pivotally mounted on stationary pins 6 contained within the casing 2. Blades 5 are adapted to be moved to opened and closed positions by a ring member 7, which ring member is provided with an upstanding cam projection 8, which cam projection has the angularly offset end 9 of a wire spring 10 extending therethrough. Wire spring 10 is tensioned so as to urge the cam projection and hence ring member 7 in a clockwise direction, as viewed in Figs. 3 and 4, and hence this spring 10 tends to urge the shutter blades 5 toward closed position.

In order to effect the opening of the shutter blades 5 in use, as during instantaneous exposures, the shutter operating lever 11, which is pivoted on a pin 12, has a pivoted arm 13 for cooperating with a tapered depending projection 14 formed on a C-shaped actuating lever 15 that is pivoted upon a pin 16 held by the casing 2. A wire spring 17 is coiled about the pin 16 and has one end thereof pressed against a lug 18 formed on the C-shaped actuating lever 15 and the other end of this spring is engaged by the timing lever 19. Spring 17 tends to turn the C-shaped actuating lever 15 in a counterclockwise direction about its pivotal pin 16, so that with the shutter closed, as illustrated in Fig. 3, the lower end of lever 15 presses against the interior wall of casing 2.

The lower end of lever 15 has an inwardly directed radial projection 20 thereon, which projection is adapted to ride over the upper inclined surface 21 of cam projection 8 when the shutter operating lever 11 is depressed. Thus, assuming that the timing lever 19 is positioned at the 1/50 second position, as shown in Fig. 3, and the shutter operating lever 11 is depressed to take a picture, the arm 13 of lever 11 will engage the shouldered end of depending projection 14, thereby turning the C-shaped actuating lever 15 in a clockwise direction against the tension of wire spring 17. As the actuating lever 15 thus turns, the radially projecting end 20 thereof will engage and ride up upon the inclined surface 21 of cam projection 8. Continued downward movement of the operating lever 11 will ultimately cause the end of pivoted arm 13 to move out of engagement with the depending projection 14 of lever 15. Just previous to the disengagement of arm 13 from projection 14 of the actuating lever, the radial projection 20 of this lever will snap over the high point of the inclined surface 21 of the cam projection 8 so that this radial projection 20 will now engage the vertical edge of the cam projection 8 as shown in Figs. 4 and 5.

Spring 17 which is relatively stiff, now acts, by overcoming the tension of spring 10, to immediately turn the C-shaped actuating lever in a counterclockwise direction about its pivotal support 16, thereby also turning the cam projection 8 and the ring member 7 in a counterclockwise direction, thereby effecting the instantaneous opening of the shutter blades 5. As the shutter blades 5 reach their full open position, the beveled free end of the radial projection 20 will ride off of the cam projection 8, thereby permitting spring 10 to immediately move the shutter blades 5 to closed position, thereby terminating the exposure.

According to the preferred arrangement, the novel device of this invention for synchronizing the flash-bulb and camera shutter operations comprises an electrical socket member 22 which is attached to the outer wall of casing 2. Socket member 22 has two prong recesses 23, one of which prong recesses has a contact member therein (not shown) which is grounded upon the casing 2 and the other of these prong recesses has a contact member therein (not shown) which is electrically connected to a spring contact blade 24, which contact blade is mounted upon but insulated from the side wall of casing 2 as by means of insulation 25. Spring contact blade 24 projects transversely within the interior of shutter casing 2 above the C-shaped actuating lever 15 and has its free end portion 26 overlying and slightly spaced from the top of a right-angled contact member 27 when the shutter blades 5 are in their closed positions.

When the shutter blades 5 open in use, as during an exposure, the contact member 27 will move with the cam projection 8. Thus, as illustrated in Fig. 9 with the shutter closed, the contact member 27 will assume the position marked #1 in this figure, in which position the top of this contact member is spaced from the undersurface of spring contact 24. As the shutter starts to open, for example, when the shutter blades reach their positions shown in Fig. 4, the contact member 27 will have moved to the position marked #2 in Fig. 9, in which position the top of this contact member engages the contact blade 24.

Continued opening movement of the shutter blades causes contact member 27 to slide along the undersurface of spring contact blade 24, thereby providing a wiping contact with this contact blade. When the shutter blades have reached their full open positions, the contact member 27 will have reached the position marked #3 in Fig. 9. During the closing movement of the shutter blades, the contact member 27 will wipe along the spring contact blade 24 from positions #3 to #2. After leaving position #2, the contact member 27 will disengage the contact blade 24. Owing to the relatively great length of the contact blade 24, the slight flexure of this blade in use, due to the engagement therewith of the contact member 27, will not injure this contact blade nor will the same be permanently displaced after repeated use.

A typical photo-flash bulb and battery is illustrated in Fig. 2. In this figure, the photo-flash bulb 28 is threaded into a socket 34 provided in a battery casing 29 having a battery 30 therein. One terminal of the battery 30 is connected through a conductor 31 to one of the prongs 32 of a plug 33 and the other terminal of the battery 30 is connected through the socket 34, lead 35, switch 36 and conductor 37 to the other prong 38 of the plug 33.

In use, when it is desired to take a photo-flash picture, the operator merely inserts the plug 33 into the socket member 22 provided on casing 2 and closes switch 36, preparing the circuit for the photo-flash bulb. He then sets the timing lever 19 to the desired exposure, for example, the 1/50 of a second exposure shown in Fig. 3, and thereafter presses upon the shutter operating lever 11, effecting the rapid opening and closing of the shutter. During a considerable portion of the opening and closing movements of the shutter, the contact member 27 has a wiping action upon the spring contact blade 24 as previously described, thereby providing ample time for fully completing the circuit for the photo-flash bulb and effecting the ignition of this bulb in synchronization with the operation of the camera shutter. Owing to the relatively long wiping contact between the contact member 27 and the contact blade 24, the completion of the circuit for the photo-flash bulb and the ignition thereof is assured at the proper time. As will be apparent, the portion of this circuit within the shutter casing extends from the ungrounded contact member within socket member 22 through spring contact blade 24 and contact member 27 to ground on the casing and from thence to the other contact member of socket member 22.

It will be noted that the contact member 27 is directly connected through cam projection 8 to shutter blade operating ring member 7, so that as the shutter blades operate, the contact member 27 is caused to move in synchronization with such operation, there being substantially no back lash between this contact member and the shutter blades. This synchronous operation of the contact member 27 with the shutter blades enables this contact member to properly time the closure of the circuit for the photo-flash bulb 28, which closure is assured by the relatively long wiping engagement between the contact member 27 and the spring contact blade 24.

In Figs. 6 to 8, the novel device of the present invention for synchronizing the photo-flash bulb and camera shutter operations is shown applied to a different and well known German type of camera shutter, but the method of operation in this case is substantially the same as described in connection with the preceding figures. In Figs. 6 to 8, the shutter casing 40 is provided with a shutter operating lever 41, which lever actuates a pin 42 fixed on a shutter blade actuating lever 43. Shutter blade actuating lever 43 carries a contact pin member 44 for cooperating with a spring contact blade 45 that is mounted upon though insulated from the side wall of casing 40 as by insulation 47. In view of the fact that the shutter operating mechanism of this camera shutter is well known to those skilled in the art, is complicated in nature and is not a part of the present invention, the same has not been described in detail. An electrical socket member 46, which is similar to electrical socket member 22, is provided on the exterior of casing 40 and has one of its contact members connected to the spring contact blade 45 and its other contact member grounded upon the casing 40.

In use, when making an exposure, the shutter operating lever 41 is depressed, thereby causing shutter blade actuating lever 43 to swing upwardly so that the contact pin 44 carried thereby, moves into engagement with the spring contact blade 45. This engagement takes place just as the shutter blades 48 begin to open, as illustrated in Fig. 7, and continues during the opening movement of the blade and during the greater portion of the closing movement, thereby providing a wiping contact between the contact pin 44 and the spring contact blade 45, which wiping contact is similar to that provided in the previously described views.

Fig. 10 illustrates the wiping action of the contact pin 44 upon the contact blade 45. With the shutter closed, the contact pin 44 has the position shown designated #1 in Fig. 10. Just as the shutter blades begin to open, this pin assumes the position shown at #2 in this figure, and when the shutter blades are fully open, this pin assumes the position shown at #3 in this figure, there being a wiping engagement of the pin upon the contact blade during the movement of pin 44 from its #2 position to its #3 position, and then back again to its #2 position, thereby assuring the completion of the circuit for the photo-flash bulb in synchronization with the shutter blade operation.

It will be apparent that the novel device of the present invention may be applied to any type of camera shutter and will provide a wiping contact engagement between the contact spring and the contact member engaging the same, the only requisite being that the contact member should be carried by a movable portion of the apparatus that is closely associated with the shutter blades themselves so that there will be substantially no back lash between the operation of the shutter blades and that of the contact member which engages the spring contact blade.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:—

1. In a device for synchronizing photo-flash bulb and camera shutter operations when making instantaneous exposures, a contact member contained within the shutter casing, said contact member being arranged to be electrically connected to one side of the photo-flash bulb circuit, and a second contact member also contained within the shutter casing and arranged to be electrically connected to the other side of the photo-flash bulb circuit, said second contact member being connected to the shutter operating mechanism within the shutter casing and disposed for engaging said first contact member when the camera shutter is operated, the engagement of said second contact member with said first contact member being initiated during the early part of the opening movement of the camera shutter, to thereby complete the photo-flash bulb circuit.

2. In a device for synchronizing photo-flash bulb and camera shutter operations when making instantaneous exposures, a contact member contained within the shutter casing, said contact member being mounted upon the wall of such casing though insulated therefrom and being arranged to be electrically connected to one side of the photo-flash bulb circuit, and a second contact member contained within the shutter casing, said second contact member being carried by the shutter operating mechanism and arranged to be electrically connected to the other side of the photo-flash bulb circuit, said second contact member being disposed for engaging said first contact member with a wiping action upon the operation of the camera shutter, the engagement of said second contact member with said first contact member being initiated during the early part of the opening movement of the camera shutter, thereby completing the photo-flash bulb circuit.

3. In a device for synchronizing photo-flash bulb and camera shutter operations when making instantaneous exposures, a relatively long resilient stationary contact member contained within the shutter casing and having one end thereof mounted upon the wall of such casing though insulated therefrom, said stationary contact member being arranged to be electrically connected to one side of the photo-flash bulb circuit, and a movable rigid contact member contained within the shutter casing, said movable contact member being carried by the shutter operating mechanism and arranged to be electrically connected to the other side of the photo-flash bulb circuit, said movable contact member being disposed for engaging said stationary contact member with a wiping action upon the operation of the camera shutter, said movable contact member moving into engagement with said stationary contact member during the early part of the opening movement of the camera shutter and remaining in engagement with said stationary contact member until the latter part of the closing movement of the camera shutter, thereby completing the photo-flash bulb circuit and effecting the operation of the photo-flash bulb in synchronism with the instantaneous camera shutter operation.

4. In combination, a camera shutter having a casing together with shutter operating mechanism within said casing and a device for synchronizing the operation of a photo-flash bulb with the operation of the camera shutter when making instantaneous exposures, said device comprising a stationary electric contact member contained within said casing, said stationary contact member being mounted upon, though insulated from, the inner wall of said casing, a movable contact member contained within said casing, said movable contact member being attached to the shutter operating mechanism and arranged to engage said stationary contact member upon the operation of said camera shutter, such engagement taking place during the opening movement of the camera shutter and an electrical socket member provided on said casing, said socket member having one socket contact electrically connected to said stationary contact member and another socket contact electrically connected to said casing.

5. In combination, a camera shutter having a casing together with shutter operating mechanism within said casing and a device for synchronizing the operation of a photo-flash bulb with the operation of the camera shutter, when making instantaneous exposures, said device comprising a stationary spring contact blade contained within said casing, said contact blade having one end thereof mounted upon, though insulated from, the inner wall of said casing, a movable rigid contact member contained within said casing, said movable contact member being attached to the shutter operating mechanism and arranged to engage said stationary contact blade with a wiping motion upon the operation of said camera shutter, said movable contact member moving into engagement with said stationary contact blade during the early part of the opening movement of the camera shutter and remaining in engagement with said stationary contact blade during the greater portion of the movement of the camera shutter, and an electrical socket provided on said casing, said socket having one socket contact electrically connected to said stationary contact blade and another socket contact electrically connected to said casing.

6. In combination, a camera shutter having a casing together with shutter operating lever mechanism within said casing and a device for synchronizing the operation of a photo-flash bulb with the operation of the camera shutter when making instantaneous exposures, said device comprising a relatively long flexible contact blade having one end thereof fixedly secured to the inner wall of said casing, means for insulating said contact blade from said casing, a rigid movable contact member contained within said casing, said movable contact member being attached to the shutter operating lever mechanism and disposed adjacent the free end portion of said contact blade, said movable contact member being arranged to engage said contact blade with a wiping action upon the operation of said camera shutter, said movable contact member moving into engagement with said stationary contact blade during the early part of the opening movement of the camera shutter and remaining in engagement with said stationary contact blade during the greater portion of the movement of the camera shutter, and an electrical socket provided on the exterior wall of said casing, said electrical socket having one socket contact electrically connected to said contact blade and another socket contact electrically connected to said movable contact member.

GEORGE F. BOESSER.